United States Patent
Li (10) Patent No.: US 8,360,079 B2
(45) Date of Patent: Jan. 29, 2013

(54) SOLAR LIGHTING ARRANGEMENT FOR OUTDOOR UMBRELLA

(75) Inventor: Wanda Ying Li, Santa Ana, CA (US)

(73) Assignee: Oliver Joen-An Ma, Arcadia, CA (US)

( * ) Notice: Subject to any disclaimer, the term of this patent is extended or adjusted under 35 U.S.C. 154(b) by 757 days.

(21) Appl. No.: 10/844,601

(22) Filed: May 11, 2004

(65) Prior Publication Data

US 2005/0005530 A1 Jan. 13, 2005

Related U.S. Application Data (63) Continuation-in-part of application No. 10/436,192, filed on May 12, 2003, now Pat. No. 6,830,058.

(51) Int. Cl.
*A45B 3/02* (2006.01)
(52) U.S. Cl. .......................................... 135/16; 135/910
(58) Field of Classification Search .................... 135/16, 135/910, 31, 98; 362/102
See application file for complete search history.

(56) References Cited

U.S. PATENT DOCUMENTS

| 2,047,045 | A * | 7/1936 | Veenboer | 362/249.19 |
|---|---|---|---|---|
| 2,087,537 | A * | 7/1937 | Finkel | 362/102 |
| 4,174,532 | A * | 11/1979 | Kelley | 362/102 |
| 6,298,866 | B1 * | 10/2001 | Molnar, IV | 135/16 |
| 6,302,560 | B1 * | 10/2001 | Lai | 362/249 |
| 6,439,249 | B1 * | 8/2002 | Pan et al. | 135/16 |
| 6,666,224 | B2 * | 12/2003 | Lee | 135/16 |
| 6,840,657 | B2 * | 1/2005 | Tung | 362/352 |
| 6,959,996 | B2 * | 11/2005 | Ip | 362/102 |
| 2002/0074027 | A1 * | 6/2002 | Maidment | 135/16 |
| 2003/0067765 | A1 * | 4/2003 | Li | 362/102 |

\* cited by examiner

*Primary Examiner* — Noah Chandler Hawk
(74) *Attorney, Agent, or Firm* — Raymond Y. Chan; David and Raymond Patent Firm (57) ABSTRACT

A solar lighting arrangement, which is incorporated with an outdoors umbrella, includes a solar energy collector mounted on top of the outdoors umbrella, a chain lighting arrangement, an attachable lighting system, and a light support, which is adjustably mounted along a supporting shaft of the outdoors umbrella at a position within the shadowing area of the awning frame, including a plurality of supporting arms radially extended from the supporting shaft, and a plurality of illuminators connecting to the supporting arms respectively in a movably suspended manner such that by selectively adjusting a position of the light support along the supporting shaft, the illuminators are suspendedly self-repositioned for maximizing a light coverage area within the shadowing area.

6 Claims, 12 Drawing Sheets

SOLAR LIGHTING ARRANGEMENT FOR OUTDOOR UMBRELLA

CROSS REFERENCE OF RELATED APPLICATION

This is a Continuation-In-Part application of a non-provisional application having an application Ser. No. 10/436,192 and a filing date of May 12, 2003 now U.S. Pat. No. 6,830,058.

BACKGROUND OF THE PRESENT INVENTION

1. Field of Invention

The present invention relates to an outdoors umbrella, and more particularly to an outdoors umbrella incorporated with a solar lighting arrangement for securely providing illumination by utilizing solar energy.

2. Description of Related Arts

Outdoors umbrellas have been proved to be extremely popular among those frequently expose to outdoor environment. In the daytime, a typical outdoor umbrella may be utilized as a temporary shelter so that people or instruments under the umbrella are protected from high temperature or vigorous sunlight. Moreover, depending on the material by which the umbrella fabric is fabricated, even in cloudy or rainy weather, the outdoors umbrella may be utilized as a rain shelter or wind shelter. On the other hand, the typical outdoors umbrella is adapted to incorporate with a lighting system wherein a plurality of illuminating units are mounted on the awning ribs for providing a predetermined degree of illumination to a lighting zone defined as the area under the umbrella fabric. Therefore, people may utilize the outdoors umbrella with the lighting system in a variety of outdoors activities during nighttime, such as barbecuing, camping, outdoors gathering, or other events which involve considerable outdoors exposure at night.

The very advantage and convenience of the typical outdoors umbrella, however, do not shelter its disadvantages. It is the feature that the umbrella is capable of being utilized as a light source in an outdoors environment that renders its desirability to locate close to an external power source. Yet in an outdoors environment, the external power source, at least in the sense of the most typical power source for lighting system—electrical power source, cannot be guaranteed. One might utilize a rechargeable battery as the power source, but an additional step of charging the battery is inevitably needed. Very often, charging the battery can only be taken place when the umbrella is idle. Therefore, for example, when the user of the umbrella forgets charging the battery, the lighting system would not work on the next day. Sometimes, where the rechargeable battery cannot be conveniently detached from the outdoors umbrella, charging the battery would mean allocating extra space to store or to place the outdoor umbrella while the battery is being recharged.

The mounting arrangement of most of the outdoors umbrellas represents another problem. A considerable numbers of outdoors umbrellas have their lighting system mounted insecurely or in such a manner that the lighting system is functionally incompatible with the normal operation of the outdoor umbrellas themselves. As result, the performance of the respective lighting system is far from satisfactory. For example, during folding and unfolding operations of the outdoors umbrella, the awning ribs thereof may accidentally destroy the illuminating units of the lighting system. Since such outdoors umbrellas are designed for use in outdoors environment, as a result, secure mounting of the illuminating units are of utmost importance. If the lighting system is so insecure that, when subject to certain outdoors phenomenon, such as against a sudden strong wind, the lighting system is incapable of safely or unstably operating, it would not only cause disruption to the activities in which it uses, but also harm to the users, especially those standing or sitting within the lighting zone.

Furthermore, from the dawn to the twilight, the sunlight fell on the ground keeps changing at the time. In other to obtain the optimum shade from the outdoor umbrella, the user has to move the entire outdoor umbrella back and forth sometimes.

Last but not least, the typical lighting system of the outdoors umbrellas tend to be immovable in the sense that the illuminating units are permanently affixed on the awning ribs so that the illuminating directions are limited by the orientation and movement of the awning ribs. As a result, where the outdoors umbrella needs to be inclinedly supported on the ground in order to shield a particular direction, or partially opened for a particular purpose, the lighting system could not be satisfactorily operated.

SUMMARY OF THE PRESENT INVENTION

A main object of the present invention is to provide an outdoors umbrella which incorporates with a solar lighting arrangement for providing illumination utilizing solar energy as an external energy source. Thus, the solar lighting arrangement is environmentally friendly and economical to operate.

Another object of the present invention is to provide an outdoors umbrella with a solar lighting arrangement, wherein the electrical operation of the solar light system is substantially unaffected by the folding and unfolding operation of the outdoors umbrella so that it is capable of fully operating while the outdoors umbrella is partially or inclinedly erected.

Another object of the present invention is to provide an outdoors umbrella with a solar lighting arrangement which does not alter the original structural design of the outdoors umbrella, so as to minimize any potential risk of damage to the solar lighting arrangement while the outdoor umbrella is folding or unfolding.

Another object of the present invention is to provide an outdoors umbrella with a solar lighting arrangement which is capable of collecting solar energy while being exposed to sunlight to convert into electrical energy for recharging a power source to the illuminating units whenever necessary.

Another object of the present invention is to provide an outdoors umbrella comprising a solar lighting arrangement, wherein no complicated mechanical and electrical structure and mechanism is required to incorporate with the outdoors umbrella so as to minimize the manufacturing and related cost of the present invention.

In order to accomplish the above objects, the present invention provides an outdoors umbrella, comprising:

an awning frame comprising a plurality of elongated awning arms radially extended in a pivotally movable manner and a shading awning substantially supported by the awning to define a shadowing area thereunder;

a supporting frame comprising a supporting shaft having an upper portion connected to the awning frame; and a solar lighting arrangement, comprising:

a solar energy collector mounted on top of the awning frame for collecting solar energy;

a light support, which is adjustably mounted along the supporting shaft at a position within the shadowing area of the awning frame, comprising a plurality of supporting arms radially extended from the supporting shaft;

a plurality of illuminating units each comprising an illuminator electrically connected to the solar energy collector through the awning frame and a coupling joint connecting the illuminator to the respective supporting arm in a movably suspended manner such that by selectively adjusting a position of the light support along the supporting shaft, the illuminators are suspendedly self-repositioned for maximizing a light coverage area within the shadowing area;

a chain lighting arrangement comprising a plurality of illumination holders provided along the awning arms respectively, and a plurality of chain lighting units, which is electrically connected to the solar energy collector, aligned held by the illumination holders along the awning arms for reinforcing the illumination effects; and an attachable lighting arrangement comprising at least an illuminating unit, a plurality of illuminating unit supporters, each of which is formed on a lower end of respective awning arm, and a plurality of illuminating unit adaptors each of which has a holding member securely connected the illuminating unit and an engagement member slidably engaged with the illuminating unit supporters, wherein the illuminating unit adaptor is detachably attached to the illuminating unit supporters in such a manner that the illuminating unit connected to the illuminating unit adaptor is capable of sliding to maintain a substantially vertical orientation no matter the awn frame is in folding or unfolding position.

These and other objectives, features, and advantages of the present invention will become apparent from the following detailed description, the accompanying drawings, and the appended claims.

DETAILED DESCRIPTION OF THE PREFERRED EMBODIMENT

Figure 1:
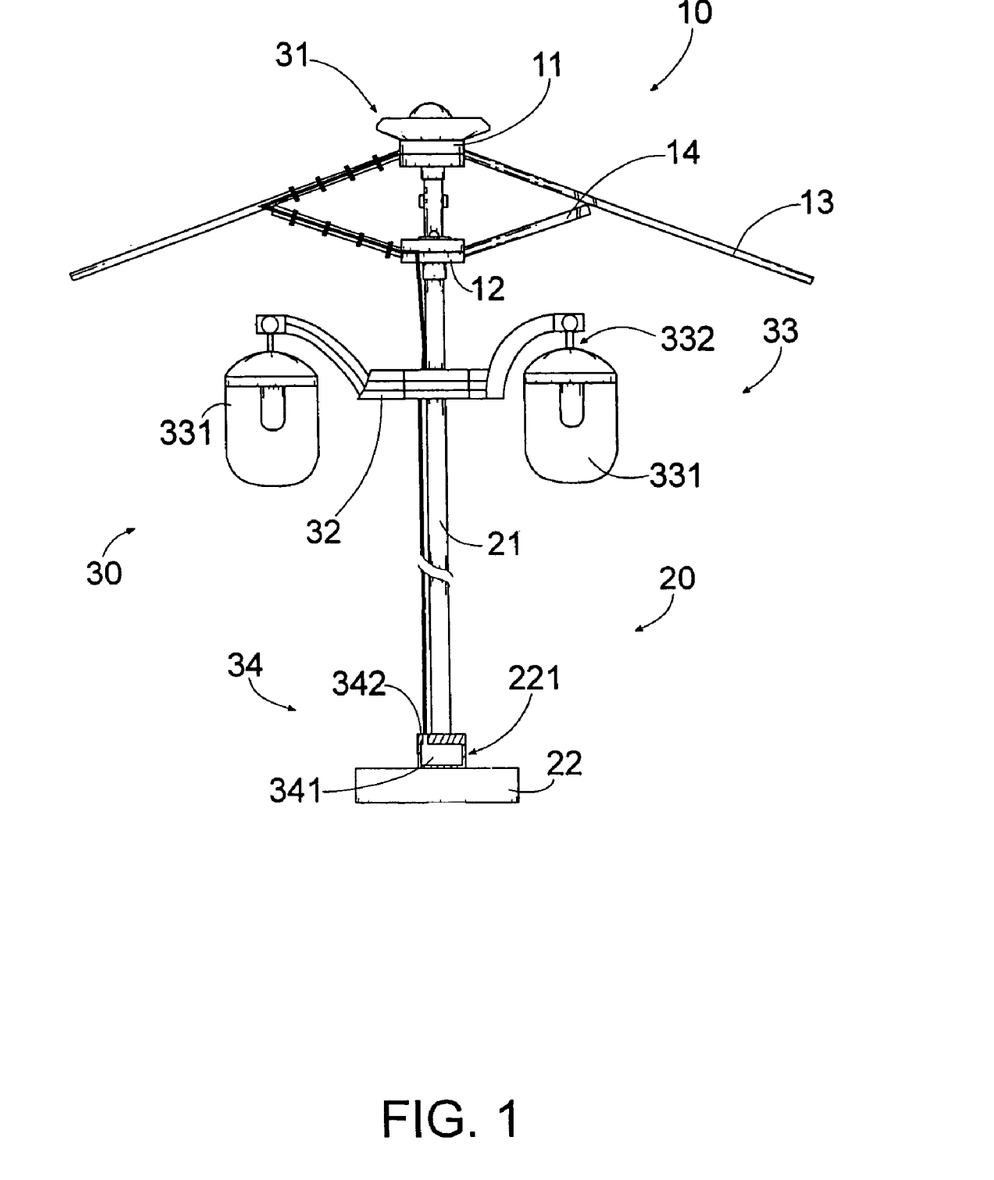
FIG. 1 is a schematic diagram of an outdoors umbrella incorporated with a solar lighting arrangement according to a preferred embodiment of the present invention.

Referring to FIG. 1 of the drawings, an outdoor umbrella 1 according to a preferred embodiment of the present invention is illustrated, wherein the outdoor umbrella 1, such as a conventional outdoor umbrella, comprises an awning frame 10 defining a shadowing area 101 thereunder and a supporting frame 20 comprising a supporting shaft 21 having an upper portion connected to the awning frame 10.

The outdoor umbrella 1 further comprises a solar lighting arrangement 30 comprising a solar energy collector 31 mounted on top of the awning frame 10 for collecting solar energy, a light support 32, and a plurality of illuminating units 33.

The light support 32, which is adjustably mounted along the supporting shaft 21 at a position within the shadowing area 101 of the awning frame 10, comprises a plurality of supporting arms 321 radially extended from the supporting shaft 21.

Each of illuminating units 33 comprises an illuminator 331 electrically connected to the solar energy collector 31 through the awning frame 10 and a coupling joint 332 connecting the illuminator 331 to the respective supporting arm 321 in a movably suspended manner such that by selectively adjusting a position of the light support 32 along the supporting shaft 21, the illuminators 331 are suspendedly self-repositioned for maximizing a light coverage area within the shadowing area 101.

According to the preferred embodiment, the awning frame 10 comprises an upper housing 11 affixed on top of the supporting shaft 21, a lower housing 12 slidably connected to the supporting shaft 21 at a position below the upper housing 11, a plurality of awning arms 13 radially and pivotally extended from the upper housing 11 to support an awning shelter 15 thereon, and a plurality of awning ribs 14 pivotally connecting the lower housing 12 with the awing arms 13 respectively in such a manner that when the lower housing 12 is slid along the supporting shaft 21 towards the upper housing 11, the awning arms 13 are pivotally driven by the awning ribs 14 to radially extended from the upper housing 11 so as to provide the shadowing area 101 under the awning shelter 15.

The supporting frame 20 further comprises a ground stand 22 wherein the supporting shaft 21 is upwardly extended from the ground stand 22 to support the awning frame 10.

Figure 2:
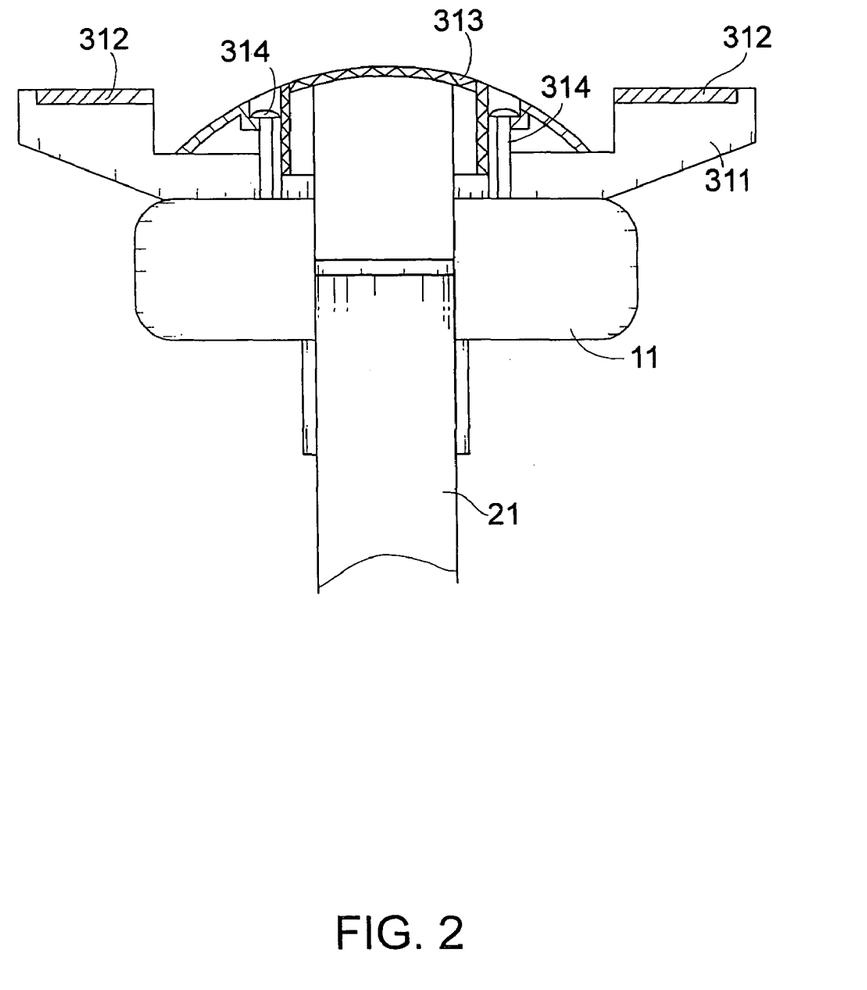
FIG. 2 is a sectional view of the solar lighting arrangement of the outdoors umbrella s according to the above preferred embodiment of the present invention, illustrating the solar energy collector of the solar lighting arrangement.

Referring to FIG. 2, the solar energy collector 31 comprises a collector base 311, having a circular shaped, coaxially mounted on a top end portion of the supporting shaft 21 at a position above the upper housing 11, and a solar energy collecting device 312 which is provided on a platform of the collector base 311 and is upwardly oriented for collecting the solar energy so as to convert the solar energy into electrical energy to the illuminators 331.

In order to further secure the attachment between the solar energy collector 31 and the supporting shaft 21, the solar energy collector 31 further comprises a protective cover 313 substantially affixed to the upper housing 11 on top of the supporting shaft 21 so as to securely sandwich the collector base 311 between the upper housing 11 and the protective cover 313. As shown in FIG. 2, in order to facilitate the secure attachment, two connecting elements 314, which are preferably two rivets, can be utilized to mount the protective cover 313 to the upper housing 11 through the upper housing 11 to securely clamp the collector base 311 between the upper housing 11 and the protective cover 313, so as to retain the solar energy collecting device 312 in position.

Figure 3:
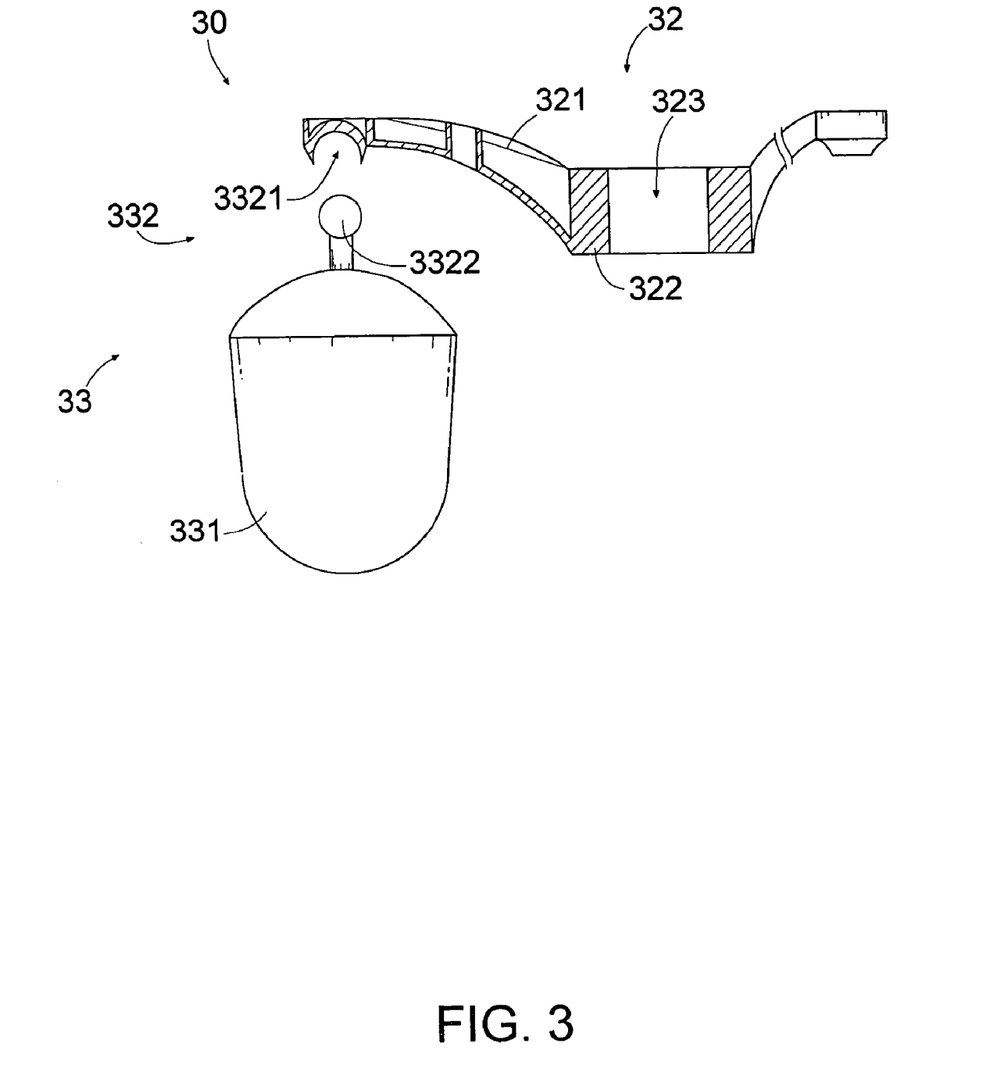
FIG. 3 is a partially sectional view of the lighting system of the outdoors umbrella according to the above preferred embodiment of the present invention, illustrating the illuminating unit of the solar lighting arrangement.

As shown in FIG. 3, the light support 32 further comprises a central hub 322 having a central sliding through slot 323 for the supporting shaft 21 sliding therethrough, wherein the supporting arms 31 are spacedly and radially extended from the central hub 322.

Each of the illuminators 331 is embodied as a light bulb wherein the illuminators 331 are electrically connected to the solar energy collecting device 312 of the solar energy collector 31 along one of the awning arms 13 and the respective awning rib 14 via an electric cable, as shown in FIG. 1, in such a manner that the electrical connection between the illuminators 331 and the solar energy collector 31 will not be interfered by the awning frame 10, especially the folding and unfolding operation of the awning frame 10 of the outdoor umbrella 1. Accordingly, the awning arms 13 and the awning ribs 14 are constructed to have a hollow shape such that the electric cable is adapted to pass through the respective awning arm 13 and the awning rib 14 to electrically connect the solar energy collector 31 to the respective illuminator 331.

It is worth to mention that each illuminator 331 is preferably embodied as a Light Emitting Diode (LED) received in a light housing since the LED of the illuminator 331 provides a predetermined set of illumination parameters, such as brightness, color etc. so as to provide optimal illumination for a range of designated applications while being energy effective.

Furthermore, the solar lighting arrangement 30 further comprises a chain lighting arrangement 34 and an attachable lighting arrangement 35, respectively mounted on the body and the lower end of awning arms 13 for primarily providing illumination effect to the shadowing area 101 defined by the awning frame 10 so as to enrich the illuminating effects.

Figure 4:
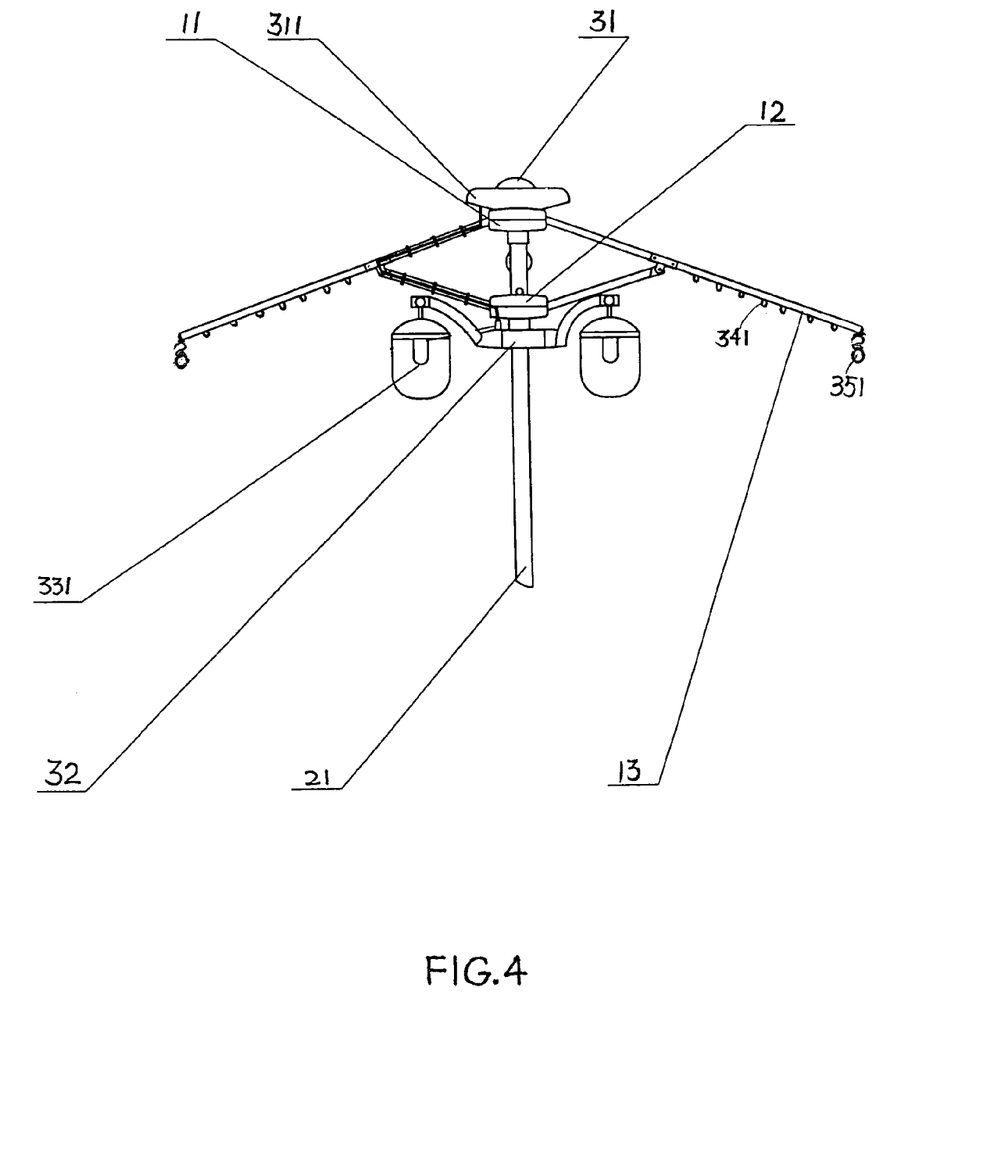
FIG. 4 is a schematic diagram of the outdoors umbrella showing the chain lighting arrangement and attachable lighting arrangement of the solar lighting arrangement according to the first preferred embodiment of the present invention.
Figure 5:
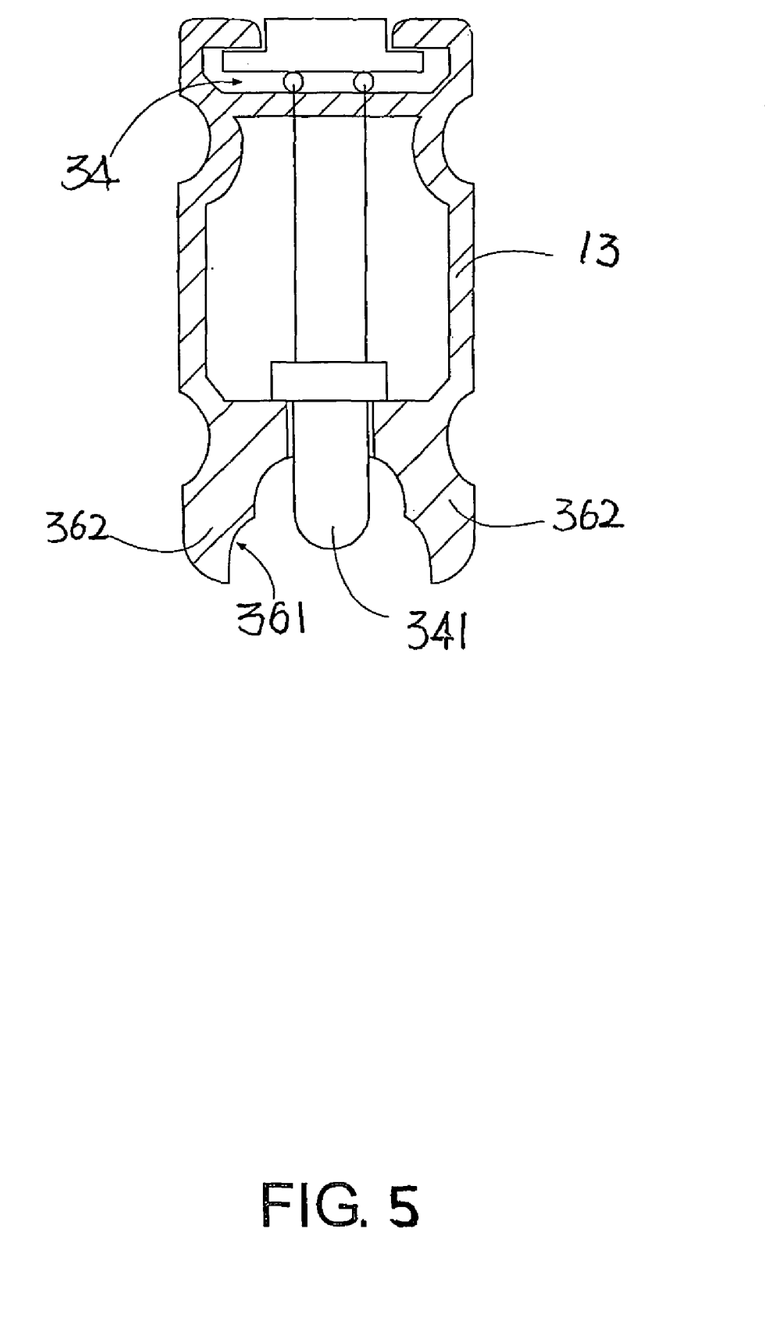
FIG. 5 is a sectional view of an elongated awning arm incorporated the chain lighting arrangement according to the first preferred embodiment of the present invention.
Figure 6:
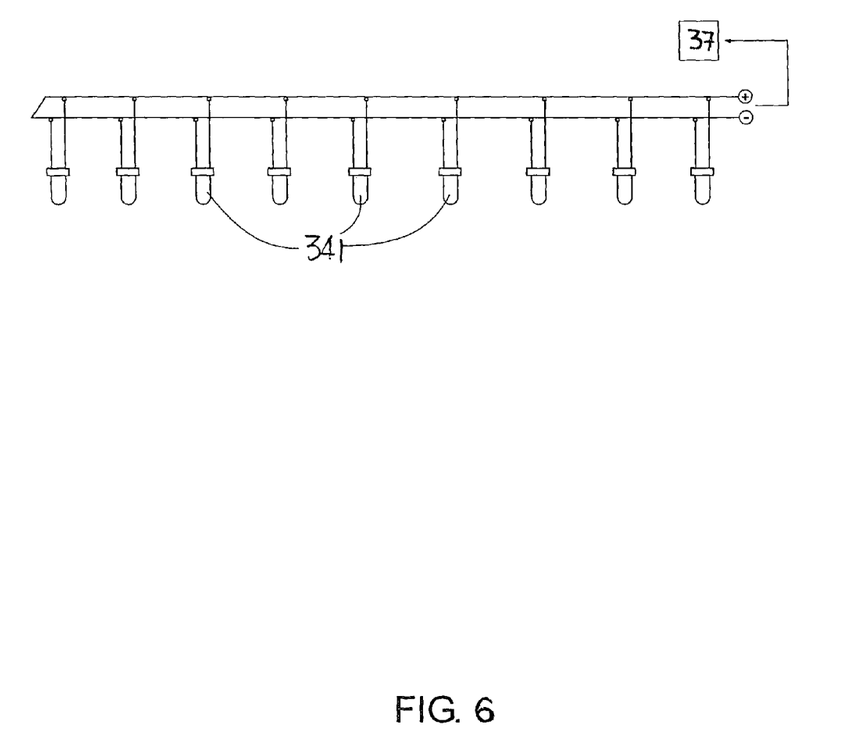
FIG. 6 is a schematic diagram of the connection of the chain lighting units according to the above preferred embodiment of the present invention.

Referring to FIG. 4-6 of the drawings, the chain lighting arrangement 34 according to the first preferred embodiment of the present invention is illustrated. First of all, the chain lighting arrangement 34 further comprises a plurality of illumination holders 36 provided along the awning arm 13 respectively. Accordingly, each of the illumination holders 36 is embodied as an elongated receiving groove 361 formed along a bottom side of the respective awning arm 13. According to the first preferred embodiment of the present invention, two retaining walls 362 downwardly and integrally extended along the bottom side of each of the awning arms 13 wherein the receiving groove 361 is defined between the respective two retaining walls 362 and the bottom side along the respective awning arm 13. Accordingly, an inner side of each of the retaining walls 362 is concavely curved so that it is capable of intensively reflecting any illumination generated within the receiving groove 361 to an outside thereof.

Second, the chain lighting arrangement 34 comprises a plurality of chain lighting units 341 alignedly received in the receiving grooves 361 respectively wherein the illumination generated by the chain lighting units 341 are substantially reflected out of the receiving grooves 361 by the retaining walls 362 so as to illuminate the shadowing area 101 of the outdoors umbrella 1. Moreover, since the chain lighting units 341 are substantially received in the receiving grooves 361 respectively, they are substantially protected from any potential damage resulting from any mechanical operation of the outdoors umbrella 1 of the present invention, such as folding or unfolding. In other words, the chain lighting arrangement 34 of the present invention substantially overcome the conventional disadvantage of frangibility of illuminating elements caused by the umbrella's own mechanical operations, such as folding and unfolding movement.

According to the preferred embodiment, each of the awning arms 13 is a hollow body wherein the electrical wires could be inserted. As a result, it is convenient for communicating the interior of awning arm 13 and the receiving groove 361, for example, through a plurality of slots or a continuous slit, etc.

In order to further protect the chain lighting arrangement 34 from potential physical damage by external objects, the chain lighting arrangement 34 further comprises a plurality of light holders 343 slidably inserted into the awning arm 13 respectively. The chain lighting units 341 are spacedly mounted at the respective light holder 343 such that light holder 343 is capable of holding the chain lighting units 341 in position along the awning arms 13 thus protecting the chain lighting units 341 within the receiving grooves 361 respectively.

Referring to FIG. 6 of the drawings, the chain lighting units 341 disposed in each of the awning arm 13 are electrically connected in series through the respective awning arms 13 wherein an electric cord is received in the respective awning arm 13 for electrical connection. Further, the electric cord has two terminals, namely positive and negative, which are extended to the upper housing 11 and then electrically connected to a power source for the provision of energy so as to light up the chain lighting units 341. According to the preferred embodiment, the chain lighting units 341 could be embodied as regular LEDs which are capable of illuminating light of different colors and brightness.

The chain lighting arrangement 30 further comprises an IC board 37 mounted in the upper housing 11 wherein the terminals for electric cord mounted on each of the awning arms 13 are electrically connected to the IC board 37 which is further electrically connected to a power source via electrical wires.

From the forgoing description, it is shown that the outdoors umbrella 1 of the present invention comprises the chain lighting units 341 which are embedded in the awning arms 13 respectively to form an integral awning body. As a result, users of the present invention can enjoy illumination without fear of any storage or operational damages to the outdoors umbrella 1.

Figure 7:
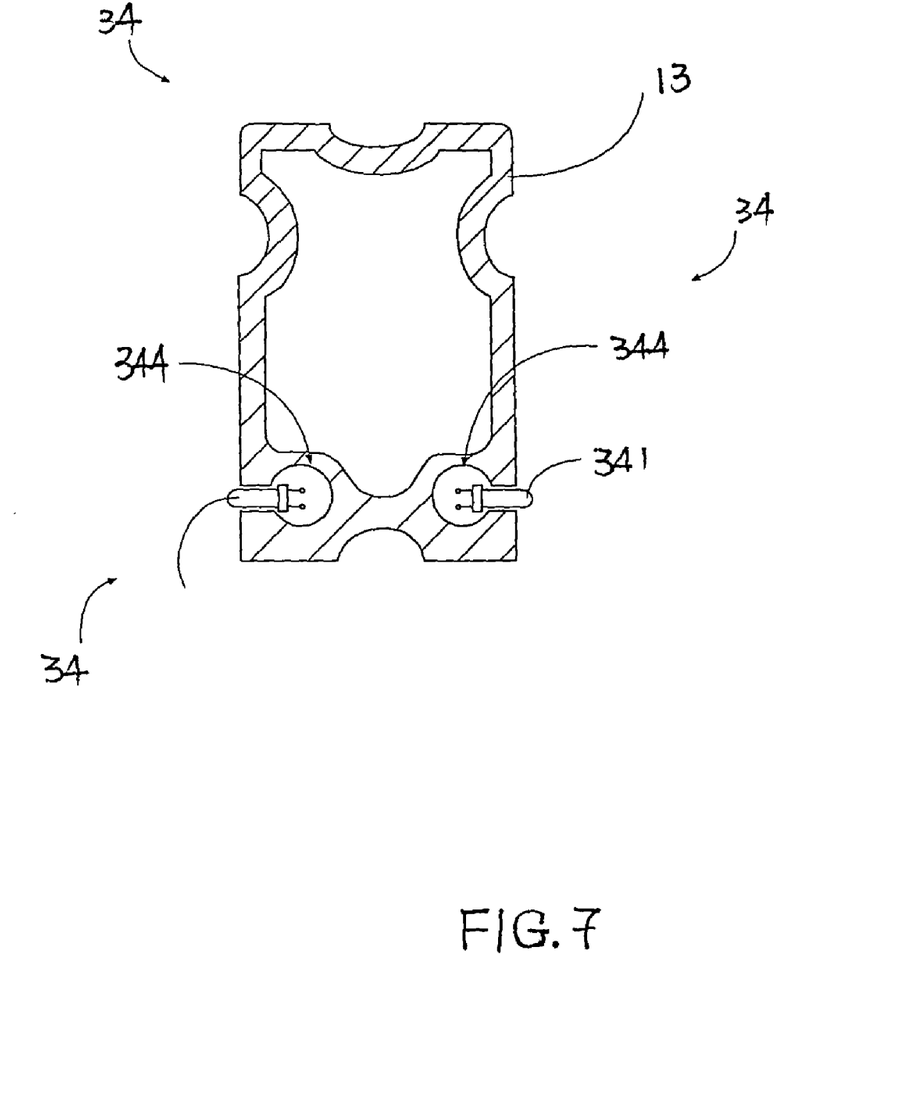
FIG. 7 is a first alternative mode of the chain lighting arrangement according to the above preferred embodiment of the present invention.

Referring to FIG. 7 of the drawings, a first alternative mode of the chain lighting arrangement 34 according to the above preferred embodiment of the present invention is illustrated. According to the first alternative mode, there are two lighting slots 344 indently formed on two sidewalls of each of the awning arms 13 respectively wherein the chain lighting units 341 of the chain illuminating system 34 are alignedly received in the lighting slots 37 respectively. Here, the chain lighting units 341 in each of awning arms 13 are also electrically connected in series through the respective awning arms 13 by the electric cord which is received in the respective lighting slot 344, wherein the electrical cord has two terminals, namely positive and negative, which are extended to the upper housing 11 and then electrically connected to a power source for the provision of energy to light up the chain lighting units 341.

Figure 8:
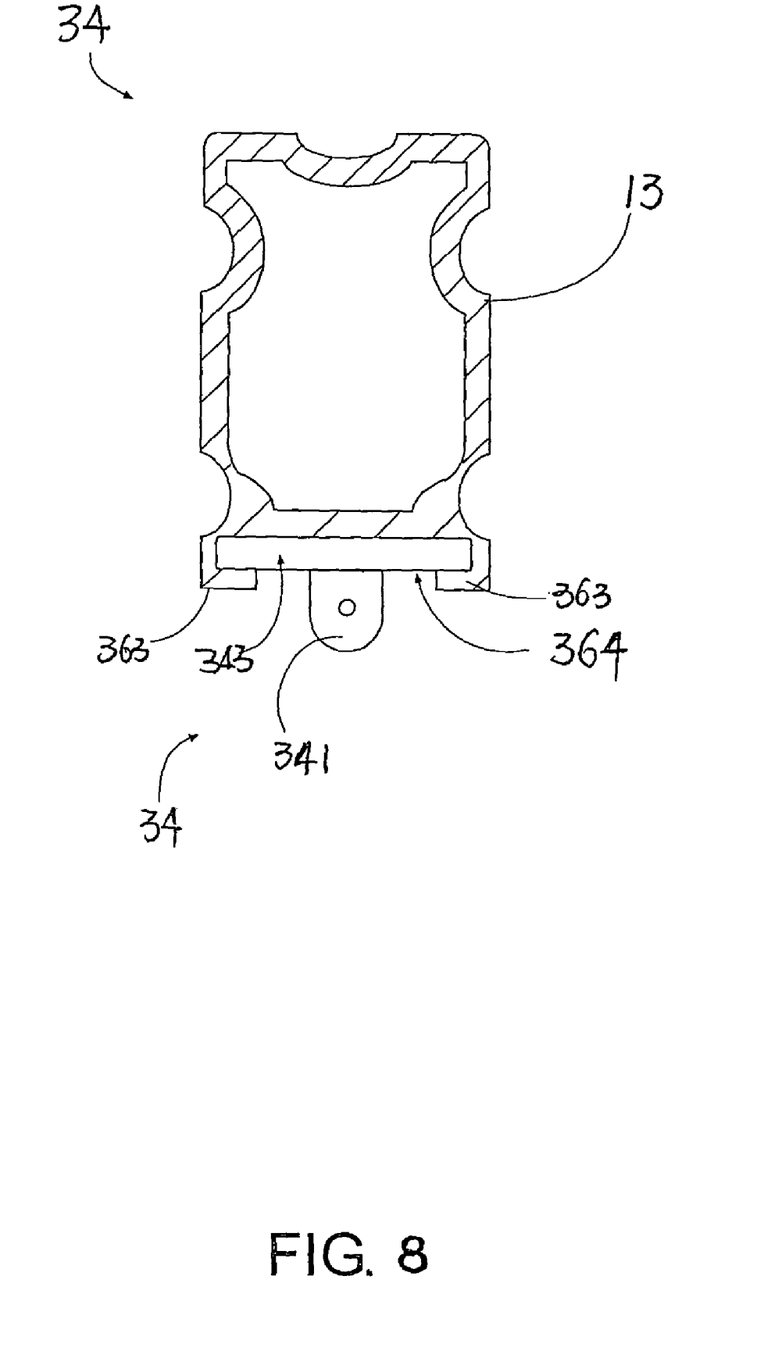
FIG. 8 is a second alternative mode of the chain lighting arrangement according to the above preferred embodiment of the present invention.

Referring to FIG. 8 of the drawings, a second alternative mode of the chain lighting arrangement 34 is illustrated. Here, the retaining wall 362 and the receiving groove 361 in the preferred embodiment cease to exist. Furthermore, the L-shaped electric boundaries 363 are provided at a bottom side of each of the awning arms 13 to define a receiving groove 364, while the light holders 343 is embodied as an elongated protective strip being sildably mounted into the receiving groove 364. The electric cord connecting the illuminating units 341 is arranged to be embedded or totally buried into the elongated protective strip to prevent any possible direct contact with external objects, thus reducing the possibility of being damaged thereby. Likewise, the electric cord is then extended to a power source for acquiring transmitting electricity to the chain lighting units 341.

Figure 9:
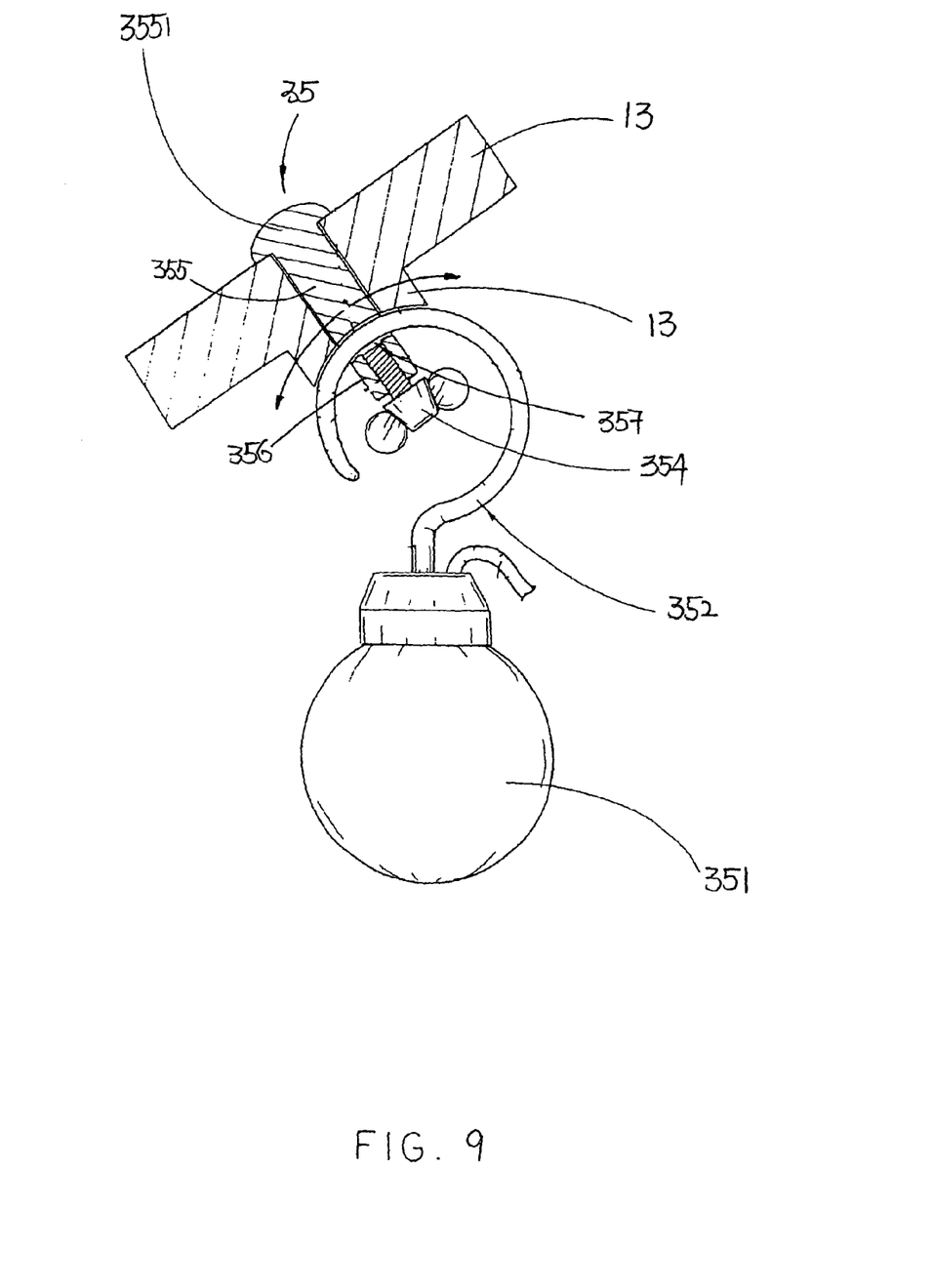
FIG. 9 is a sectional view of the attachable illuminating arrangement according to the above preferred embodiment of the present invention illustrating how the illuminating unit maintains its substantially vertical orientation while the awning arm is extended in an inclined position.

Referring to the FIG. 9 of the drawing, the attachable lighting arrangement 35 is illustrated. Here, the attachable lighting arrangement 35 comprises at least an attachable illuminating unit 351 for generating light, and means for attaching the illuminating unit 351 to the lower end of the respective awning arm 13 in a vertically down hanging manner so as to maintain the light generated by the illuminating unit 351 directing downwards no matter the awning frame 10 is in the unfolded position or in folded position. Preferably, the illuminating unit 351 is a typical light bulb. It is noted that the illuminating unit 351 can be other illuminating article such as LED, halogen lamp, fluorescent lamp, and so on.

As shown in the FIG. 9, the attaching means comprises an illuminating unit adaptor 352 connected to the illuminating unit 351 and an illuminating unit supporter 353 provided at the respective lower end of the awning arm 13, wherein the illuminating unit adaptor 352 is detachably mounted to the illuminating unit supporter 353 in a suspending manner. Moreover, the attachable lighting arrangement 35 further comprises a locking means 354 for locking the illuminating unit 351 at any position with respect to the awning frame 10.

Furthermore, the attachable lighting arrangement 35 is embodied to be detachably mounted at the lower end of the respective awning arm 13. According to the preferred embodiment, the illuminating unit supporter 353 is embodied as (but not limited to) a shank body 355 transversely extended therethrough, which has an enlarged head 3551 mounted on an outer side of lower end of the respective awning arm 13 and a connecting member 356 protruded from an inner side of the lower end of the awning arm 13, wherein a mounting slot 357 is transversely penetrating through the connecting member 356.

Figure 10:
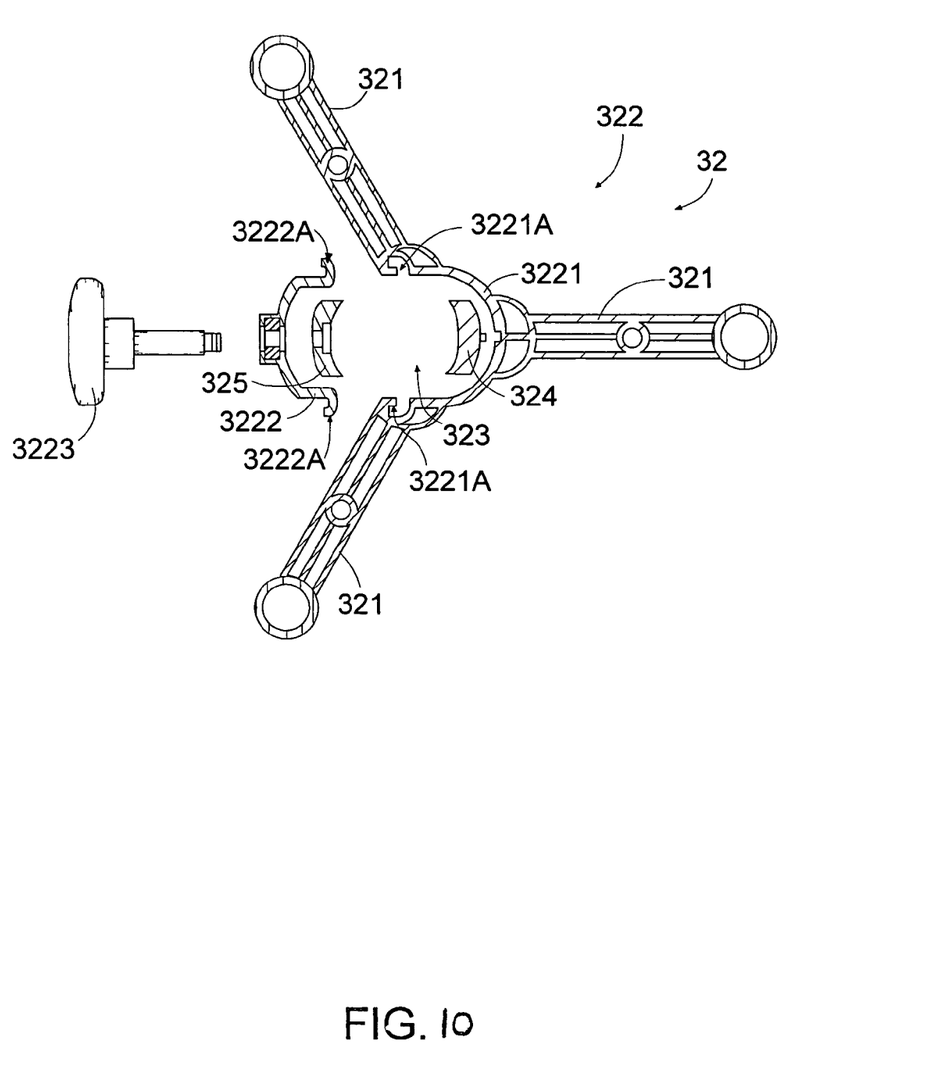
FIG. 10 is an exploded sectional view of the light support of the solar lighting arrangement according to the above preferred embodiment of the present invention.

Here, as shown in the FIG. 10, each of the coupling joints 332 has a ball slot is 3321 formed at a distal end of the respective supporting arm 321 and comprises a spherical head 3322 which is formed on top of the respective illuminator 331 and is arranged to engage with the respective ball slot 3321 in a rotatably movable manner, so as to provide a ball joint to connect the each of the illuminators 331 with the respective supporting arm 321. In other words, the illuminators 331 are capable of self-rotating while being suspendedly supported by the supporting arms 321 so as to enhance the flexibility of the provision of illumination to the outdoors umbrella 1.

It is worth to mention that a size of the spherical head 3322 is slightly smaller than the size of the respective ball slot 3321 wherein an outer wall of the ball slot 3321 is fabricated by elastic materials, such as plastic, so that by slightly pressing the spherical head 3322 to the respective ball slot 3321, the spherical head 3322 is capable of moving within the respective ball slot 3321 in free-swinging manner.

According to the preferred embodiment, there are three supporting arms 321 radially and suspendedly extended from the central hub 322 wherein there are three illuminators 331 are suspendedly supported by the supporting arms 321 via the coupling joints 332 respectively.

Figure 11:
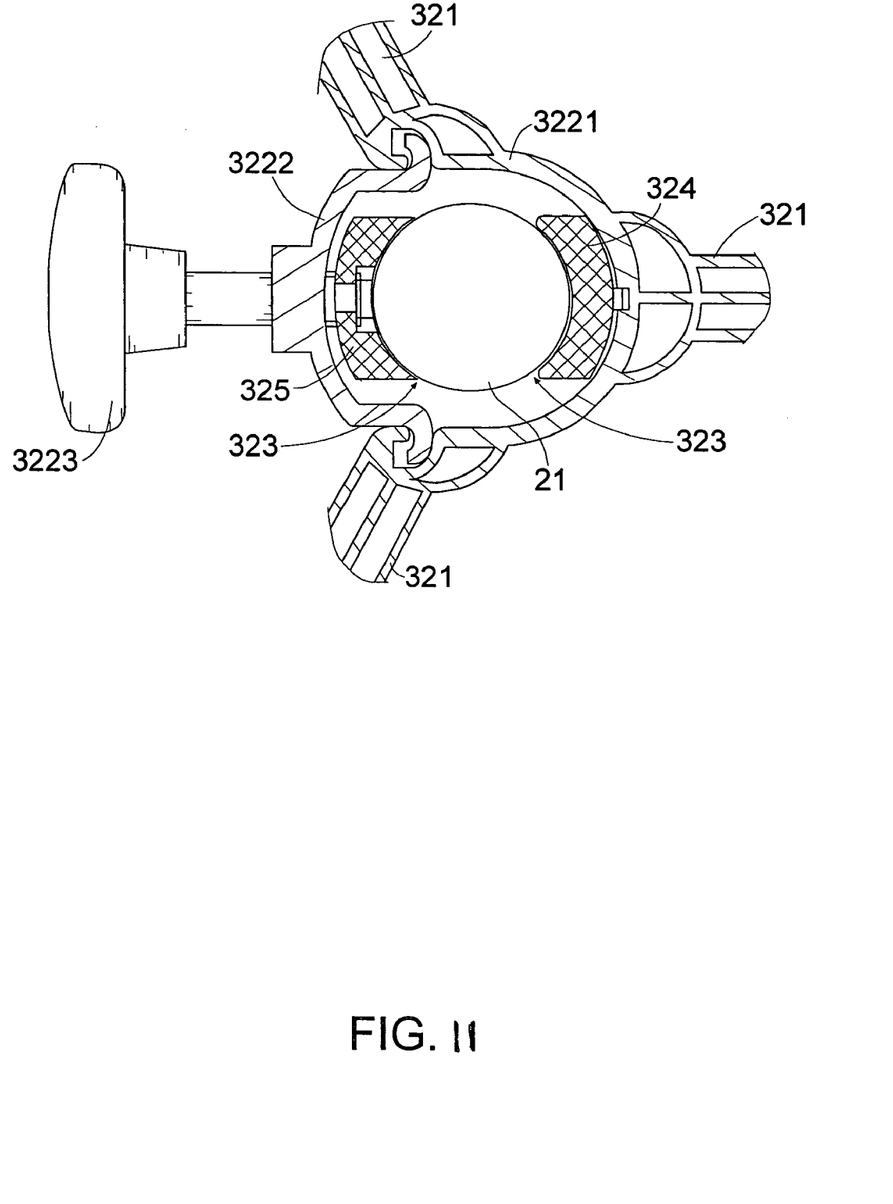
FIG. 11 is a partially sectional view of the light support of the solar lighting arrangement according to the above preferred embodiment of the present invention, illustrating the light support being mounted on the supporting shaft.

Referring to FIGS. 10 to 11 of the drawings, the central hub 322 comprises a boundary sleeve 3221 having an arc-shaped and a boundary cover 3222 interlocked with the boundary sleeve 3221 to form the central sliding through slot 323 within inner walls of the boundary sleeve 3221 and the boundary cover 3222, and a locking member 3223 having a locking end rotatably penetrated through the boundary cover 3222 to bias against the supporting shaft 21 so as to lock up the central hub 322 at the supporting shaft 21 in position.

As shown in FIG. 11 of the drawings, the boundary sleeve 3221 has two locking grooves 3221A formed along two edge portions and the boundary cover 3222 has two locking edges 3222A, each having a hook shaped corresponding to the locking groove 3221A, fittedly engaged with the locking grooves 3221A so as to interlock the boundary cover 3222 with the boundary sleeve 3221. Therefore, when the boundary cover 3222 is interlocked with the boundary sleeve 3221 to retain the supporting shaft 21 within the central sliding through slot 323, the locking member 3223 is rotated through the boundary cover 3222 until the locking end of the locking member 3223 is driven to bias against the supporting shaft 21 to lock up the light support 32 on the supporting shaft 21.

The light support 32 further comprises a first securing member 324 detachably attached to the inner wall of the boundary sleeve 3221 to bias against the supporting shaft 21 and a second securing member 325 attached to the locking end of the locking member 3223 at the inner wall of the boundary cover 3222 wherein the second securing member 325 is driven by the locking member 3223 to adjust a size of the central sliding through slot 323 for fittingly biasing against the supporting shaft 21 such that the supporting shaft 21 is securely clamped between the first and second securing members 324, 325. In other words, the light support 32 is capable of fittingly mounting on different sizes of the supporting shafts having various diameters by selectively adjusting a distance between the first and second securing members 324, 325.

As shown in FIG. 1, the solar lighting arrangement 30 further comprises a power source unit 34 which comprises a power source 341 supported by the supporting frame 20 to receive in a power source compartment 221 provided at the ground stand 22 and to electrically connect with the illuminating units 33 and an recharging device 342 electrically connecting the solar energy collector 31 with the power source 341 for converting the solar energy into the electrical energy so as to recharge the power source 341. Accordingly, during the daytime, the solar energy collector 31 collects the solar energy and charges up the power source 341 via the recharging device 342 such that the power source 341 is capable of providing electrical energy to the illumination units 33 during the nighttime. It is worth to mention that the recharging device 342 functions as an auto switch to automatically recharging the power source 341. Therefore, the recharging device 342 is capable of determining an electric capacity of the power source 341 wherein when the electric capacity of the power source 341 is full of charge, the recharging device 342 stops recharging the power source 341. However, when the electric capacity of the power source 341 is below a predetermined level, the recharging device 342 will start recharging the power source 341 from the solar energy collector 31 until the electric capacity of the power source 341 is full of charge.

It is also worth mentioning that from the forgoing elaboration, one can easily see that the solar lighting arrangement 30 is capable of securing mounting onto the supporting shaft 21 of the supporting frame 20 without affecting the operation of the outdoors umbrella 1 as a whole. Moreover, the illuminating units 33 of the solar lighting arrangement 30 are capable of freely orientating so that when the outdoors umbrella 1 occasionally requires inclined erection or open partially, the solar lighting arrangement 30 will always provide optimal illumination, irrespective of such occasions.

Figure 12:
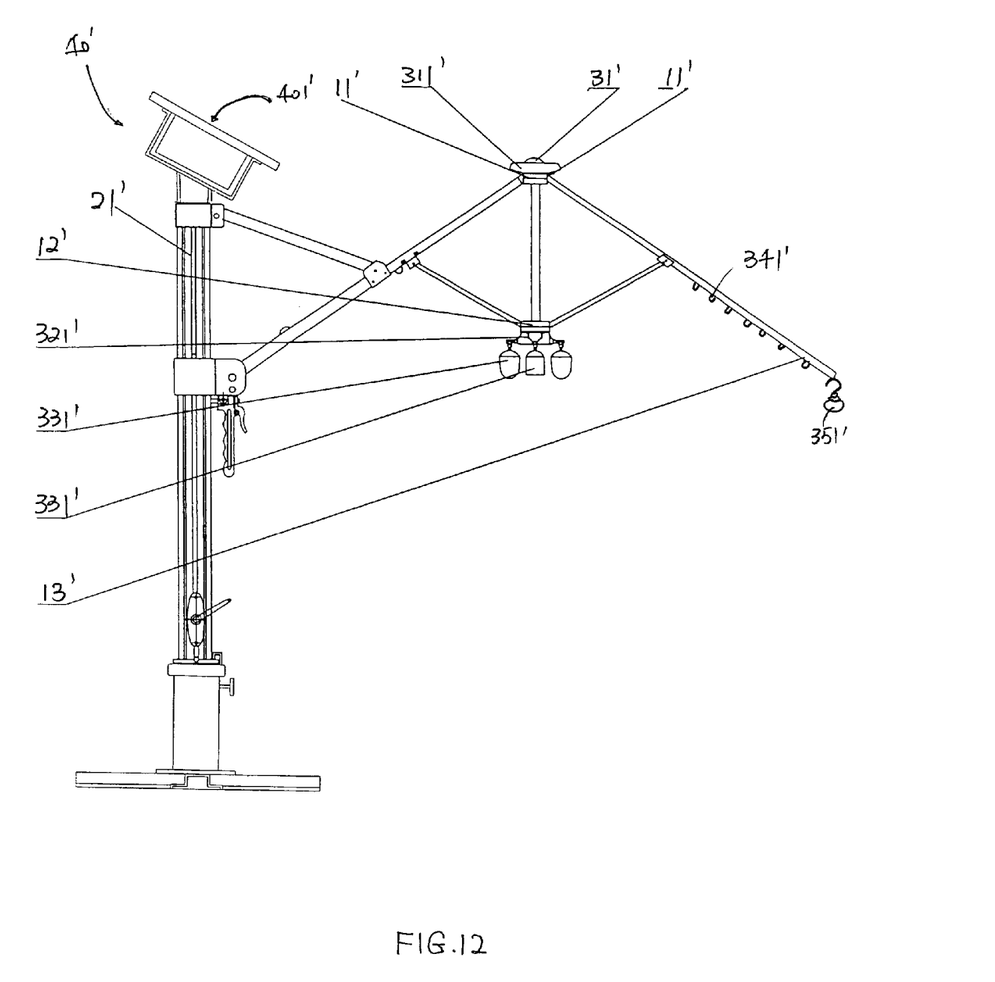
FIG. 12 is schematic view of the outdoors umbrella according to the second preferred embodiment of the present invention.

Referring to FIG. 12 of the drawings, an outdoor umbrella 1' according to a second preferred embodiment of the present invention is illustrated, wherein the outdoor umbrella 1', such as a conventional outdoor umbrella, comprises an awning frame 10' defining a shadowing area 101' thereunder and a supporting frame 20' comprising a supporting shaft 21' having an upper portion connected to the awning frame 10'.

The outdoor umbrella 1' further comprises a connecting arm 22' sidewardly extended from a top portion of the main supporting shaft 21' in a pivotally moveable manner, and an supporting arm 23' slidably mounted on the connecting arm 22' for supporting an awning frame 10'.

Here, the awning frame 10' comprises a longitudinal awning shaft 16', an upper housing 11' affixed on top of the awning shaft 16', a lower housing 12' slidably connected to the awning shaft 16' at a position below the upper housing 11', a plurality of awning arms 13 radially and pivotally extended from the upper housing 11' to support an awning shelter 15' thereon, and a plurality of awning ribs 14' pivotally connecting the lower housing 12' with the awing arms 13' respectively in such a manner that when the lower housing 12' is slid along the awning shaft 16' towards the upper housing 11, the awning arms 13 are pivotally driven by the awning ribs 14' to radially extended from the upper housing 11' so as to provide the shadowing area 101' under the awning shelter 15'.

In other words, the awning frame 10' are capable of being moved in such a manner that they are adapted to move between a folded position and a unfolded position, wherein the folded position, the awning arms 13' are pivotally and inwardly folded to overlappedly lay in position, wherein in the unfolded position, the awning arms 13' are pivotally and outwardly extended to support the awning frame 10' thereon and to define a shadowing area 101' under the awning shelter 15'.

The outdoor umbrella 1' further comprises a solar lighting arrangement 30' comprising a solar energy collector 31' mounted on top of the awning frame 10' and top of the supporting shaft 21' for collecting solar energy, a light support 32', and a plurality of illuminating units 33'.

The light support 32', which is adjustably mounted on the lower housing 12' for strengthening the illumination effects. Preferably, the awning frame 10' comprises a plurality of supporting arms 321' radially extended from the lower housing 12'.

Each of illuminating units 33' comprises an illuminator 331 electrically connected to the solar energy collector 31' through the awning frame 10' and a coupling joint 332' connecting the illuminator 331' to the respective supporting arm 321' in a movably suspended manner such that by selectively adjusting a position of the light support 32' along the awning shaft 16', the illuminators 331' are suspendedly self-repositioned for maximizing a light coverage area within the shadowing area 101'.

It is worth to mention that illuminating 33' could be embodied as a regular bulb mounted on the lower housing 12'.

The supporting frame 20' further comprises a ground stand 22' wherein the supporting shaft 21' is upwardly extended from the ground stand 22' to support the awning frame 10'.

Compared with the first preferred embodiment of the present invention, the awning frame 10 is further extended away from the supporting shaft 21'. As a result, the user is able to adjust the outdoor umbrella according to the sun's position from the dawn to twilight.

Furthermore, the solar lighting arrangement 30 further comprises a chain lighting arrangement 34' and an attachable lighting arrangement 35', respectively mounted on the body and the lower end of awning arms 13' for primarily providing illumination effect to the shadowing area 101' defined by the awning frame 10' so as to enrich the illuminating effects.

It is noted that the above chain lighting arrangement 34' and attachable lighting arrangement 35, are with identical structure and design with chain lighting arrangement 34 and attachable lighting arrangement 35 of the first preferred embodiment of the present invention.

According to the alternative mode of the second preferred embodiment of the present invention, the solar lighting arrangement 30' comprises at least a central lighting element 301' and a plurality of chain illuminating units 341' mounted on the awning frame 10' for primarily providing illumination to the shielding zone defined by the plurality of awning arms 13'. Here, in this mode, the central lighting elements 301' is a regular lights bulb mounted on the lower housing 12' for providing strong illumination at a central portion of the shielding zone. The plurality of illuminating units 341' are Light Emitting Diodes (LEDs) mounted on the plurality of awning arms 13' respectively for providing mild illumination for the shielding zone.

Likewise, there is a solar energy collector 33' comprises a collector base 311', having a circular shaped, coaxially mounted on a top end portion of the awning shaft 16' at a position above the upper housing 11', and a solar energy collecting device 312' which is provided on a platform of the collector base 311' and is upwardly oriented for collecting the solar energy so as to convert the solar energy into electrical energy to the illuminators 331'.

In addition, in the second preferred embodiment, there is a solar energy collecting device 40' nested on a top portion of the supporting shaft 21', wherein the solar collecting device 40' has a collecting surface 401' arranged to face upward so that it can be exposed to sunlight for extensively collecting solar energy. Moreover, the solar collecting device 40' is adapted to collect solar energy from sunlight impinged on the collecting surface 401', and converts the collected solar energy into electrical energy, wherein the solar lighting arrangement 30' is electrically connected with the solar collecting device 401' so that the converted electrical energy is supplied to the light system 30'.

Conclusively, the solar collecting device 40' is mounted on top of the supporting shaft 21' while the solar energy collector 33' is mounted on the upper housing 11', so that the user of the outdoors umbrella can be able to adjust its orientation for maximizing the absorption of solar energy and enjoy the maximum solar energy.

At the meanwhile, it is worth to mention that in the second preferred embodiment of the present invention, the illuminators 331' are with same structure and design as the illuminator 331 in the first preferred embodiment.

Each of the illuminators 331' is embodied as a light bulb wherein the illuminators 331' are electrically connected to the solar energy collecting device 312' of the solar energy collector 31' via the awning shaft 16'.

Here, as shown in the FIG. 13, each of the coupling joints 332' has a ball slot 3321' formed at a distal end of the respective supporting arm 321' and comprises a spherical head 3322' which is formed on top of the respective illuminator 331' and is arranged to engage with the respective ball slot 3321' in a rotatably movable manner, so as to provide a ball joint to connect the each of the illuminators 331 with the respective supporting arm 321'. In other words, the illuminators 331' are capable of self-rotating while being suspendedly supported by the supporting arms 321' so as to enhance the flexibility of the provision of illumination to the outdoors umbrella 1.

It is worth to mention that a size of the spherical head 3322' is slightly smaller than the size of the respective ball slot 3321' wherein an outer wall of the ball slot 3321' is fabricated by elastic materials, such as plastic, so that by slightly pressing the spherical head 3322' to the respective ball slot 3321', the spherical head 3322' is capable of moving within the respective ball slot 3321' in free-swinging manner.

According to the preferred embodiment, there are three supporting arms 321' radially and suspendedly extended from the lower housing 12' wherein there are three illuminators 331' are suspendedly supported by the supporting arms 321' via the coupling joints 332' respectively.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure form such principles. Therefore, this invention includes all modifications encompassed within the spirit and scope of the following claims.

What is claimed is:

1. An outdoors umbrella, comprising:

a supporting frame comprising a supporting shaft having an upper portion;

an awning frame which is connected to said upper portion of said supporting frame, and comprises a plurality of elongated awning arms radially extended in a pivotally movable manner, an awning substantially supported by said awning arms to define a shadowing area thereunder, an upper housing, a lower housing slidably connected to said supporting shaft at a position below said upper housing, wherein said awning arms are radially and pivotally extended from said upper housing to support said awning thereon, and a plurality of hollow awning ribs pivotally connecting said lower housing with said awning arms respectively; and a solar lighting system, comprising:

a solar energy collector mounted on top of said awning frame and supported on top of said upper housing for collecting solar energy;

a light support, which is adjustably mounted along the supporting shaft at a position within the shadowing area of the awning frame, comprising a central hub having a central sliding through slot for said supporting shaft sliding therethrough, and a plurality of supporting arms radially extended from said central hub;

a plurality of illuminating units each comprising an illuminator and a coupling joint connecting said illuminator to said respective supporting arm in a movably suspended manner, wherein said illuminating units are coupled at distal ends of said supporting arms via a plurality of ball joints respectively, wherein said illuminators are self-rotated while being suspendedly supported at said distal ends of said supporting arms, such that by selectively adjusting a position of said light support along said supporting shaft in a slidably movable manner, said illuminators are suspendedly and naturally oriented by gravity for uniformly maximizing a light coverage area within said shadowing area;

an electric cable for electrically connecting to said solar energy collector through said awning frame for acquiring electricity, wherein said electric cable is extended from said solar energy collector on top of said upper housing to said illuminating unit at a position that said electric cable runs through interiors of one of said awning arms and said awning rib in such a manner that said electric cable is enabled for said awning frame being pivotally folded by a pivot movement between said awning arm and said awning rib without substantially stretching out said electric cable; and a power source unit which comprises a power source supported at a ground stand of said supporting frame to electrically connect with said illuminating units and a recharging device electrically connecting said solar energy collector with said power source for converting said solar energy into electrical energy so as to recharge said power source, wherein said illuminating units of said solar lighting system are capable of freely orientating so that when said outdoors umbrella occasionally requires inclined erection, said solar lighting system provides optimal illumination irrespective of an orientation of said outdoor umbrella.

2. The outdoors umbrella, as recited in claim 1, wherein said solar lighting system further comprises a chain lighting arrangement having a plurality of illumination holders provided along said awning arms respectively, and a plurality of chain lighting units, which is electrically and serially connected to said solar energy collector, alignedly held by said illumination holders along said awning arms for enriching illumination effects, wherein said illuminating units and said chain lighting units are powered by electricity obtained through said solar energy collector so that a user does not need to acquire electricity through external power source.

3. The outdoors umbrella, as recited in claim 2, wherein said solar lighting system further comprises an attachable lighting arrangement comprising at least an attachable illuminating unit, a plurality of illuminating unit supporters each of which is formed on a lower end of respective said awning arm, and a plurality of illuminating unit adaptors each of which has a holding member securely connected with said illuminating unit and an engagement member slidably engaged with said illuminating unit supporters, wherein said illuminating unit adaptor is detachably attached to said illuminating unit supporters in such a manner that said illuminating unit connected to said illuminating unit adaptor is capable of sliding to maintain a substantially vertical orientation with respect to said awning frame's folding movement.

4. The outdoors umbrella, as recited in claim 3, wherein each of said illumination holders has an elongated receiving groove provided on a bottom side of said respective awning arms to alignedly receive said chain lighting units, wherein an electric cord is extended within said receiving groove to electrically connect said chain lighting units with said solar energy collector, wherein said chain lighting units are embedded along said respective awning arm.

5. The outdoors umbrella, as recited in claim 3, wherein each of said illumination holders has two lighting slots indently formed on two sidewalls of respective said awning arms, wherein said chain lighting units are alignedly received in said lighting slots respectively, wherein an electric cord is extended within each of said lighting slots to electrically connect said chain lighting units with said solar energy collector, wherein said chain lighting units are embedded along said respective awning arm.

6. The outdoors umbrella, as recited in claim 3, wherein each of said illumination holders has an elongated receiving groove provided on a bottom side of said respective awning arm and a light holder slidably inserted into said respective receiving groove, wherein said chain lighting units are spacedly mounted to said light holder such that said light holder is adapted to hold said chain lighting units in position along said respective awning arm, wherein an electric cord is extended within said receiving groove to electrically connect said chain lighting units with said solar energy collector, wherein said chain lighting units are embedded along said respective awning arm.

* * * * *